(12) United States Patent
Kobayashi et al.

(10) Patent No.: US 6,478,306 B1
(45) Date of Patent: Nov. 12, 2002

(54) SEPARATION PLATE AND A METHOD FOR PRODUCING THE SAME

(75) Inventors: Jun Kobayashi; Akira Morio, both of Fukushima-ken (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 09/552,698

(22) Filed: Apr. 19, 2000

(30) Foreign Application Priority Data

Apr. 19, 1999 (JP) .............................. 11-110312
Oct. 5, 1999 (JP) .............................. 11-283944

(51) Int. Cl.⁷ ................................................ F16J 15/12
(52) U.S. Cl. ...................................... 277/592; 277/594
(58) Field of Search ................................ 277/592, 593, 277/594, 596, 628, 644; 74/600 R, 590

(56) References Cited

U.S. PATENT DOCUMENTS

| | | | | |
|---|---|---|---|---|
| 5,852,957 A | * | 12/1998 | Saito et al. | ............... 74/606 R |
| 5,951,021 A | * | 9/1999 | Ueta | ........................... 277/593 |
| 5,951,482 A | * | 9/1999 | Iwata | ........................... 277/592 |
| 6,073,938 A | * | 6/2000 | Abe et al. | .................... 277/654 |

* cited by examiner

Primary Examiner—Lynne H. Browne
Assistant Examiner—Enoch E. Peavey
(74) Attorney, Agent, or Firm—Jacobson Holman, PLLC

(57) ABSTRACT

To provide a separation plate (1) mounted on a valve body (21) for automatic transmission and having a foamed rubber layer (3) mounted on both sides or one side of a separation plate body (2), which is easy to produce, advantageous in cost and free from generation of rubber burrs.

7 Claims, 8 Drawing Sheets

SEPARATION PLATE AND A METHOD FOR PRODUCING THE SAME

BACKGROUND OF THE INVENTION

1. Field of the Invention

This invention relates to a separation plate mounted on the valve body of an automatic transmission (AT) and having a foamed rubber layer formed on both sides or one side of a separation plate body that is a substrate, and a method for producing the same.

2. Description of the Prior Art

A separation plate is mounted on the valve body of an automatic transmission so as to be nipped between halved valve bodies, and this separation plate 1 comprises a steel product-made separation plate body 2 that is a substrate and a foamed rubber layer 3 applied to both sides or one side (both sides in the drawing) thereof as shown in FIG. 8.

This separation plate 1 for automatic transmission has the function as a receiving seat for receiving the spring of an accumulator or the ball of a ball check valve in addition to the sealing function for sealing the halved valve bodies together, and with respect to the part functioning as the receiving seat, the foamed rubber layer 3 is removed in only this part to expose the hard separation plate body 2 as shown in the same figure.

This surface exposed part 2a was formed in the past by covering the whole surface of the separation plate body 2 with the foamed rubber layer 3, and thereafter removing the unnecessary part 3a of the foamed rubber layer 3 by means of water jet or milling. Such a method, however, required much labor and time and higher cost because of the difficulty of uniform removal and the complicated working.

In producing the separation plate 1, the whole surface of a steel plate for forming the separation plate body 2 is covered with the foamed rubber layer 3 to mold a layered product, and the resulting layered product is then punched into a product form by press working. At that time, however, rubber burrs are generated on the circumferential part and hole peripheral part of the separation plate 1 by the press working, and such rubber burrs inconveniently flow into the valve body as foreign matter to cause a trouble in operation of the valve.

SUMMARY OF THE INVENTION

One object of this invention is to provide a separation plate relatively easy to produce, advantageous in cost, and free from rubber burs, and a method for producing the same. Another object of this invention is to provide a separation plate capable of exhibiting excellent sealing function and a method for producing the same.

A separation plate according to claim 1 of this invention is a separation plate mounted on the valve body of an automatic transmission and having a foamed rubber layer formed on both sides or one side of a separation plate body, the foamed rubber layer being applied only to the part necessary for sealing by means of dispenser coating or screen coating.

A separation plate according to claim 2 of this invention is a separation plate mounted on the valve body of an automatic transmission and having a foamed rubber layer formed on both sides or one side of a separation plate body, the foamed rubber layer being applied to the separation plate body according to the form of a land part provided on the valve body, and the foamed rubber layer being applied to the separation plate body in a width larger than the width of the land part.

A method for producing a separation plate according to claim 3 of this invention is a method for producing a separation plate mounted on the valve body of an automatic transmission and having a foamed rubber layer formed on both sides or one side of a separation plate body, which comprises applying the foamed rubber layer only to the part necessary for sealing by means of dispenser coating or screen coating.

A method for producing a separation plate according to claim 4 of this invention is a method for producing a separation plate mounted on the valve body of an automatic transmission and having a foamed rubber layer applied to both sides or one side of a separation plate body, which comprises applying the foamed rubber layer to the separation plate body according to the form of a land part provided on the valve body, and applying the foamed rubber layer to the separation plate body in a width larger than the width of the land part.

When the foamed rubber is applied only to the part necessary for sealing the separation plate body by means of dispenser coating or screen coating as in the separation plate or the method for producing the same according to claim 1 or 4 of this invention, the part to be coated with the foamed rubber is limited to only the part necessary for sealing, and the seal unnecessary part including the part forming the receiving seat to a spring or ball is not covered with the foamed rubber from the first of the production.

Since the dispenser coating or screen coating is suitable to perform the coating only to a desired part of a flat surface to be coated, the coating of the foamed rubber is performed after the press working (after the material steel plate is press worked into the product form as separation plate body, the foamed rubber is applied to a prescribed part of the separation plate body), or the coating of the foamed rubber is performed so that the foamed rubber does not extend to the press end surface (press cut surface) [after the foamed rubber is applied only to a prescribed part so as not to extend to the part forming the press end surface (press cut surface) later on the flat surface of the material steel plate, the resulting material steel plate is press worked into the product form as separation plate body], whereby generation of rubber burrs in the press working of the material steel plate can be prevented.

When the foamed rubber layer is applied to the separation plate body according to the form (land form) of the land part provided on the valve body as in the separation plate or the method for producing the same according to claim 2 or 5 of this invention, the part to be coated with the foamed rubber is limited to only the part according to the form of the land or the part necessary for sealing, and the seal unnecessary part including the part forming the receiving seat to the spring or ball is not covered with the foamed rubber from the first of the production. The land part is a protruding contact part or pressing part to the separation plate preliminarily provided on the valve body or a housing thereof.

Since the foamed rubber layer is applied to the separation plate body in a width larger than the width (land width) of the land part in the separation plate and the method for producing the same according to claim 2 or 5, the rubber thickness of the part with which the land part makes contact can be uniformed more. Accordingly, the local concentration of surface pressure can be avoided, and the part not fastened to the valve body (housing) is provided on the outside, whereby the flow of the fastening rubber to the outside can be suppressed, and the breakage, leakage and peeling of the rubber layer can be prevented. Further, the swollen part of rubber in the part not nipped by the valve body (housing) also exhibits the effect of blocking the leak passage, and the sealing performance can be accordingly improved.

According to claim 3 of this invention, the foamed rubber layer has a gently sloped root.

DESCRIPTION OF THE PREFERRED EMBODIMENTS

This invention is further described in more detail in reference to the drawings.

Figure 1:
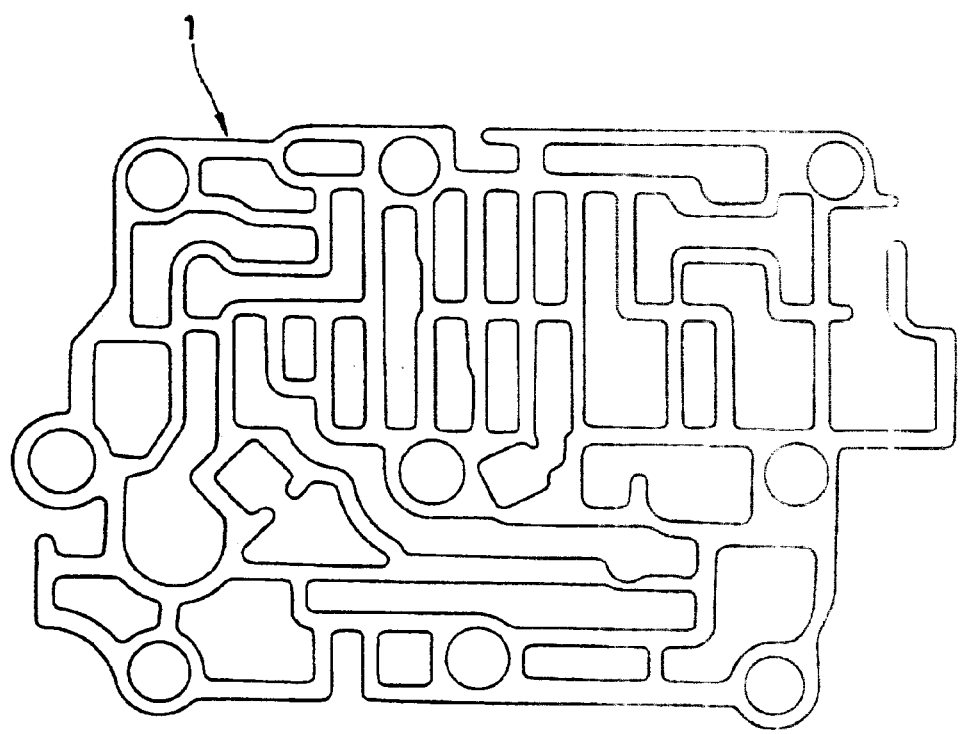
FIG. 1 is a plan view of a separation plate according to one embodiment of this invention.
Figure 2:
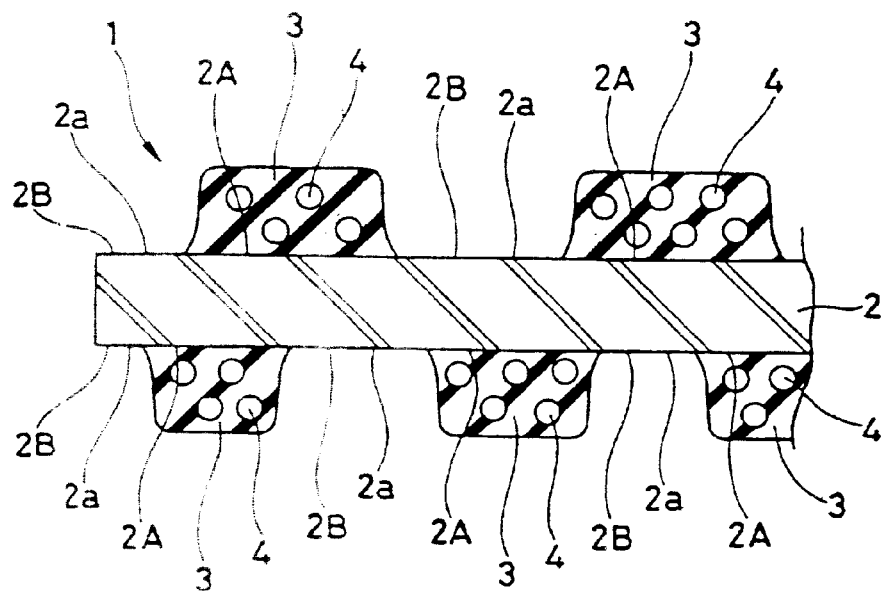
FIG. 2 is an essential part enlarged sectional view of this separation plate.
Figure 3:
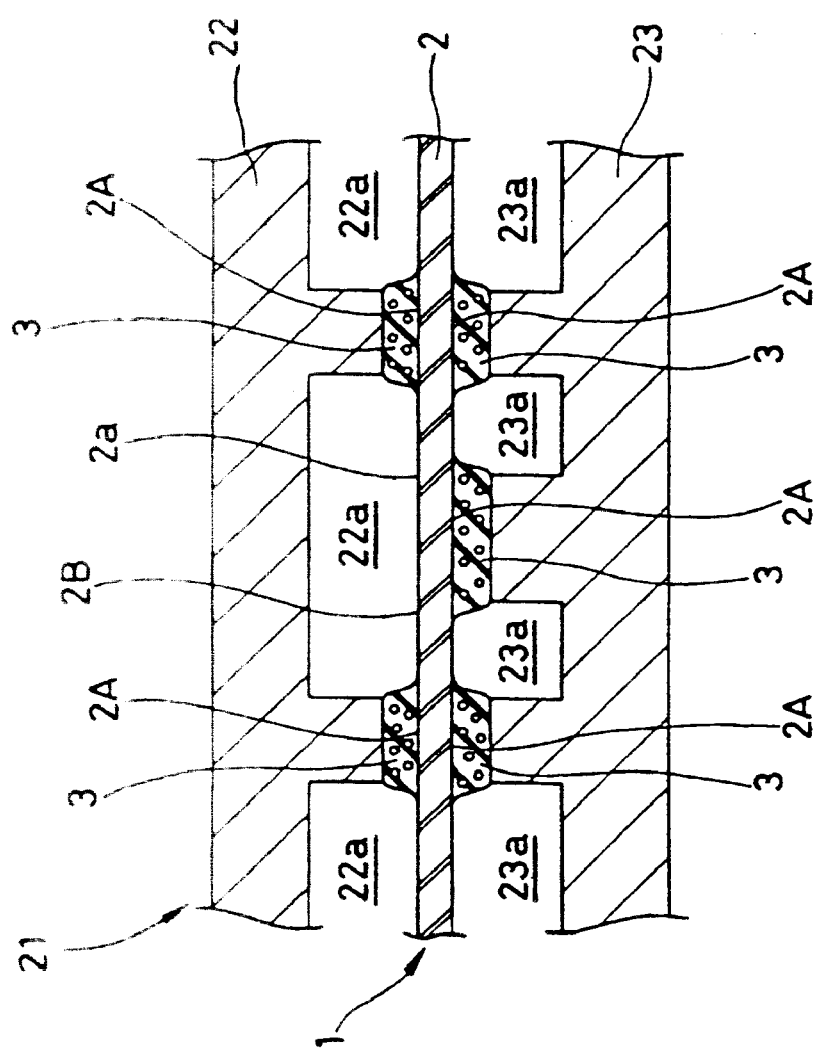
FIG. 3 is an essential part enlarged sectional view showing the mounted state of this separation plate.

FIG. 1 shows a plan view of a separation plate (called also a valve body gasket), and its essential part enlarged section is shown in FIG. 2. FIG. 3 is a sectional view in the mounted state of the separation plate.

The separation plate 1 is provided with a basic plane layout to be mounted on a valve body 21 for automatic transmission (refer to FIG. 3) as shown in FIG. 1. The separation plate 1 comprises a steel product-made separation plate body 2 and a foamed rubber layer 3 applied as a seal layer to both upper and lower sides thereof as shown in FIG. 2, and the foamed rubber layer 3 is applied only to the part necessary for sealing (sealing necessary part) 2A of the separation plate body 2 by means of dispenser coating or screen coating. Accordingly, the seal unnecessary part 2B including the part functioning as the receiving seat for receiving the ball of a ball check valve is not coated with the foamed rubber layer 3 from the first of the production, and the seal unnecessary part 2B forms a perfect surface exposed part 2a from the first.

As shown in FIG. 3, the valve body 21 for mounting the separation plate 1 is formed of vertically halved upper and lower housings 22, 23, and oil passages 22a, 23a for passing oil pressure are formed in groove shape on the lower surface of the upper housing 22 and on the upper surface of the lower housing 23, respectively. Accordingly, the separation plate 1 is nipped between the lower surface of the upper housing 22 and the upper surface of the lower housing 23 which form opposed projections by the formation of the oil passages 22a, 23a, and the part contact with the lower surface of the upper housing 22 or the upper surface of the lower housing 23 in each of upper and lower surfaces of the separation plate 1 forms the seal necessary part 2A. The foamed rubber layer 3 is thus formed in the layout substantially reversed to the layout of the oil passages 22a, 23a. Since the layout of the oil passages 22a, 23a is generally differed between the upper housing 22 and the lower housing 23, the plane layout of the foamed rubber layer 3 is accordingly differed between the upper surface and lower surface of the separation plate 2.

A number of bubble chambers (called also bubble spaces) 4 are formed in the inner part of the foamed rubber layer 3, and the presence of the bubble chambers 4 imparts particularly high elasticity or high compressible characteristic (easily crushable) to the foamed rubber layer 3.

In producing the separation plate 1 having the above structure, a single body of the separation plate body 2 is punched by a press into a production form, and after this press working, the foamed rubber layer 3 is applied only to the seal necessary part 2A by means of dispenser coating or screen coating. Otherwise the foamed rubber layer 3 is applied to the part forming the seal necessary part 2A of the separation plate 1 later in the steel plate forming the separation plate body 2 by means of dispenser coating or screen coating, and the resulting steel plate is thereafter punched by a press into the production form. In the latter case, care should be taken particularly in coating not to extend the foamed rubber layer 3 to the press end surface forming the circumferential part or hole peripheral part of the separation plate 1.

Figure 4:
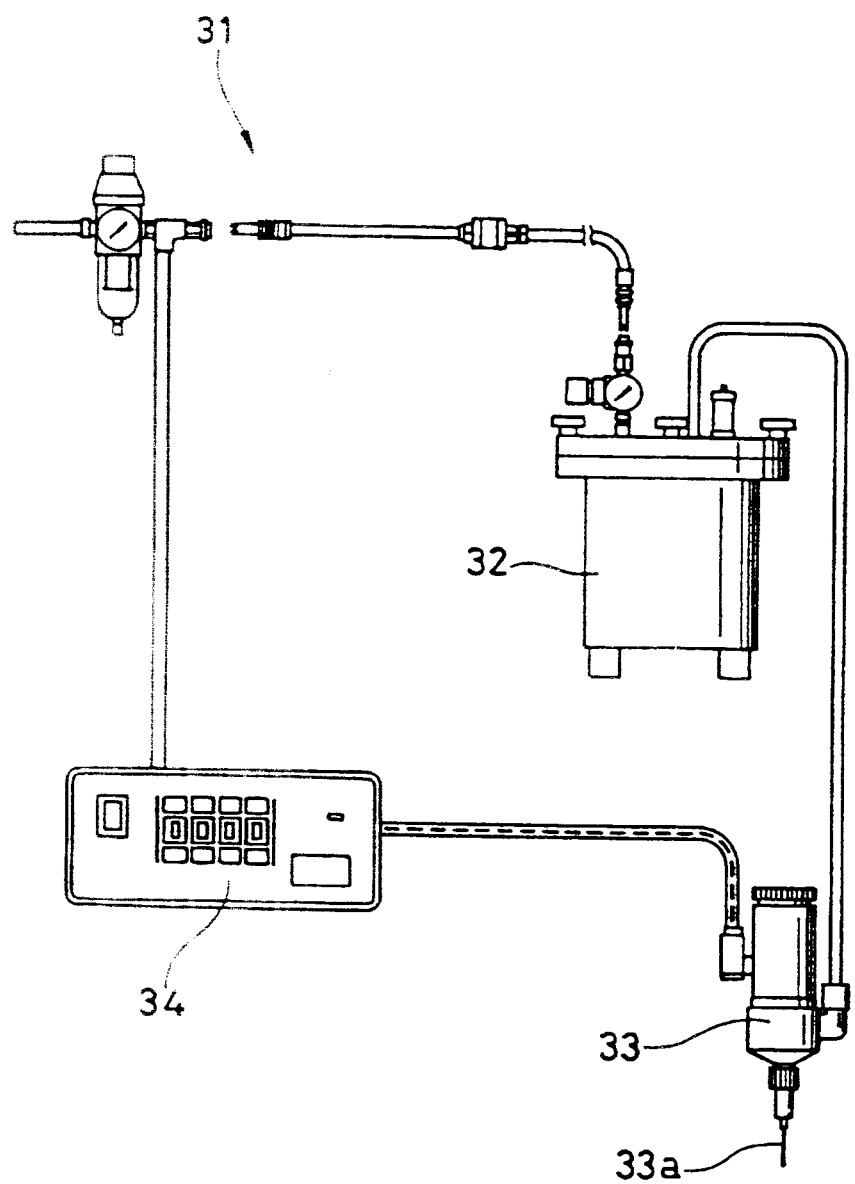
FIG. 4 is an illustrating view of a dispenser system.

In the dispenser coating for applying the foamed rubber layer 3 only to the seal necessary part 2A of the separation plate body 2, a dispenser system is used for the coating of the seal necessary part 2A of the separation plate body 2. This dispenser system 31 is provided with a basic composition such as a tank 32, a discharge valve 33 and a controller 34 as shown in FIG. 4. When this system is applied to this invention, foamed rubber is discharged from a nozzle 33a at the tip of the valve 33 in strip extending over prescribed width and height.

In the screen coating, the coating of the seal necessary part 2A is performed in the state where a screen is set in the seal unnecessary part 2B of the separation plate body 2. Both the methods are suitable to perform the coating only to a desired part of the flat surface to be coated, and characterized by the easiness of coating work.

The separation plate 1 and the method for producing the same of the above structure have the following effects.

Namely, since the seal unnecessary part 2B of the separation plate body 2 is not coated with the foamed rubber layer 3 at all from the first of the production, a surface exposed part 2a with perfectly and uniformly exposed state can be formed. Since the rubber removing work for the seal unnecessary part 2B is dispensed with from the same reason, the production of the separation plate 1 can be facilitated to reduce and the working time and working cost.

The foamed rubber layer 3 is applied after the press working, or the foamed rubber layer 3 is applied so as not to extend to the press end surface, whereby generation of rubber burrs at the time of press working can be prevented. Accordingly, the operation of the valve can be prevented from being hindered by the outflow of rubber burs as foreign matter into the valve body 21.

Further, the foamed rubber layer 3 is not arranged around insert holes for fastening bolt (not shown) provided on the separation plate 1, whereby the fatigue of the foamed rubber layer 3 by fastening can be prevented. Accordingly, the looseness of a fastening bolt resulted from the fatigue of the foamed rubber layer 3 can be prevented, and the reduction in sealing property resulted from the looseness of the fastening bolt can be prevented.

The adaptation of the dispenser coating or screen coating facilitates the coating work, and a coating with necessary minimum width and height can be performed. The using quantity of rubber can be also minimized. Accordingly, the easier production and the lower cost for product can be realized by the adaptation of such easy coating method and reduction in using quantity of rubber.

Figure 5:
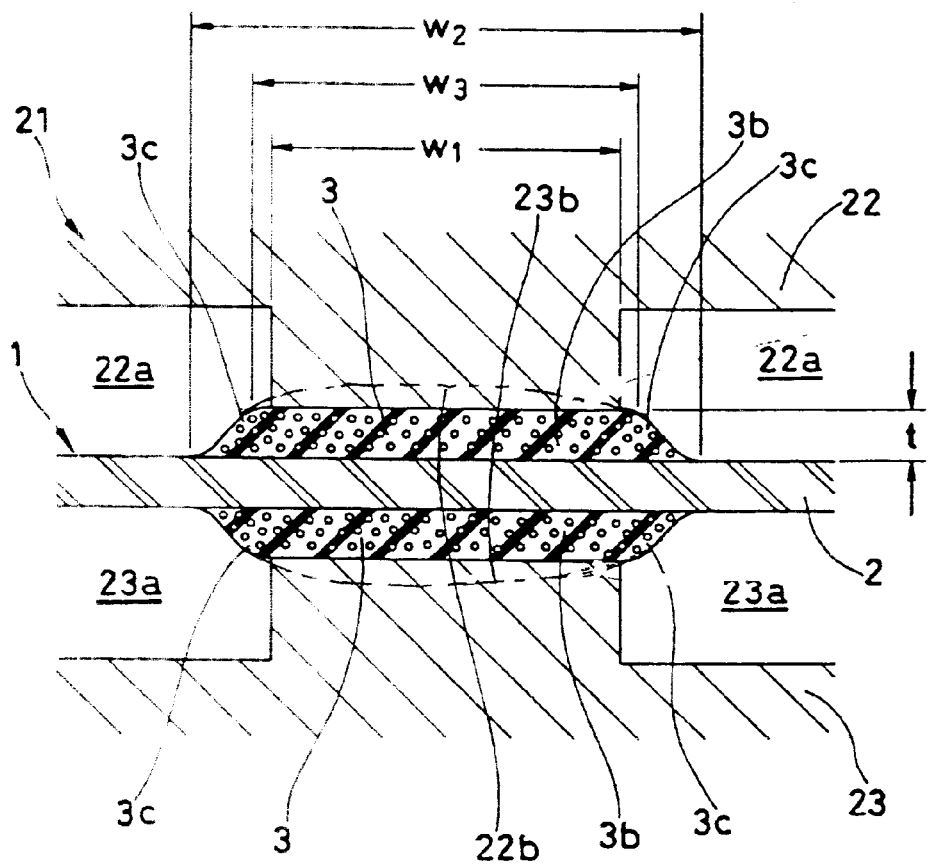
FIG. 5 is an essential part sectional view showing the state before compression of a separation plate according to another embodiment of this invention.

As described above, the mutually opposed protruding parts are formed by the formation of the oil passages 22a, 23a on the lower surface of the upper housing 22 and on the upper surface of the lower housing 23 in the valve body 21 for nipping the separation plate 1, and these parts are so-called land parts 22b, 23b as shown in FIG. 5. On the basis of the land parts 22b, 23b, the foamed rubber layer 3 is applied to the separation plate body 2 in the same form or pattern as the land parts 22b, 23b according to the form of the land parts 22b, 23b (plane form or plane layout form) in this invention, and the foamed rubber layer 3 is applied to the separation plate body 2 in a width $w_2$ larger than the width $w_1$ of the land parts 22b, 23b ($w_1 > w_2$).

As the difference in width between the land parts 22b, 23b and the foamed rubber layer 3, 0.25 mm or more by absolute size for one side is sufficient (($(w_2-w_1)/2 > 0.25$ mm). When the thickness (rubber thickness) t of the foamed rubber layer 3 is 100 μm, for example, the width (rubber coat part width) $w_2$ of the foamed rubber layer 3 may be larger than the width (counter seal surface width) $w_1$ of the land parts 22b, 23b by 2 mm (1 mm each for one side) ($w_2-w_1 \approx 2$ mm). When the width $w_2$ of the foamed rubber layer 3 is set larger than the width $w_1$ of the land part 22b, 23b in this way, the surface pressure by compression is laterally uniformed since the laterally central flat part (upper or lower surface flat part) 3b in the foamed rubber layer 3 is compressed by the land parts 22b, 23b as shown in FIG. 6, and the sealing property can be accordingly stabilized.

The thickness of the foamed rubber layer is set preferably to 50–500 μm and, more preferably, to 100–200 μm.

Figure 6:
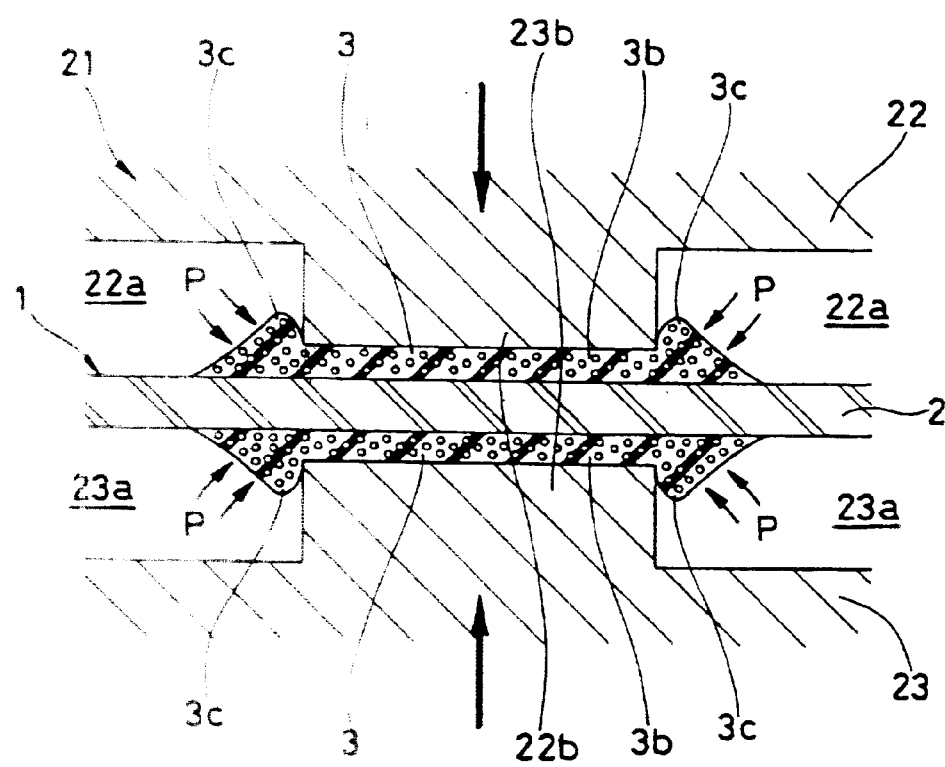
FIG. 6 is an essential part sectional view showing the compressed state of this separation plate.

The lateral ends of the foamed rubber layer 3 are laterally protruded from the land parts 22b, 23b, as shown in FIG. 6, to form the parts not compressed by the land parts 22b, 23b. Since such lateral protruding parts 3c are pressed by the pressure P of a sealed fluid instead of being compressed by the land parts 22b, 23b to press the flat part 3b from both lateral sides, the flat part 3b is laterally supported by the protruding parts 3c. Accordingly, the flat part 3b never laterally escapes even if compressed by the land parts 22b, 23b, and a rubber seal part excellent in compression resistance is accordingly formed there. Thus, the sealing property of the separation plate 1 can be improved.

The sectional form of the foamed rubber layer 3 by coating is substantially uniform in thickness in the lateral center and flattened more in the upper or lower surface thereof when the foamed rubber layer 3 has a width of a certain degree or more as shown in FIG. 5. A gently curved surface as shown by the broken line in FIG. 5 can be also adapted. In both cases, the lateral edge parts are preferably formed so as to be gradually thinned toward the ends. It is the flat part 3b having a substantially flat upper or lower surface that has a directly effective sealing effect. Accordingly, the width $w_3$ of the flat part 3b is approximated to the width $w_1$ of the land parts 22b, 23b, whereby the sealing property of the separation plate 1 can be improved, and the width $w_3$ of the flat part 3b is set larger than the width $w_1$ of the land part 22b, 23b, whereby the sealing performance of the separation plate 1 can be improved more.

The rubber suitable for use is nitrile butadiene rubber, hydrogenated nitrile butadiene rubber, acrylic rubber, fluorine rubber, or hydrin rubber.

The working is performed in the order of adhesion treatment of separation plate→rubber coating→drying→vulcanization (foaming at the same time).

Figure 7:
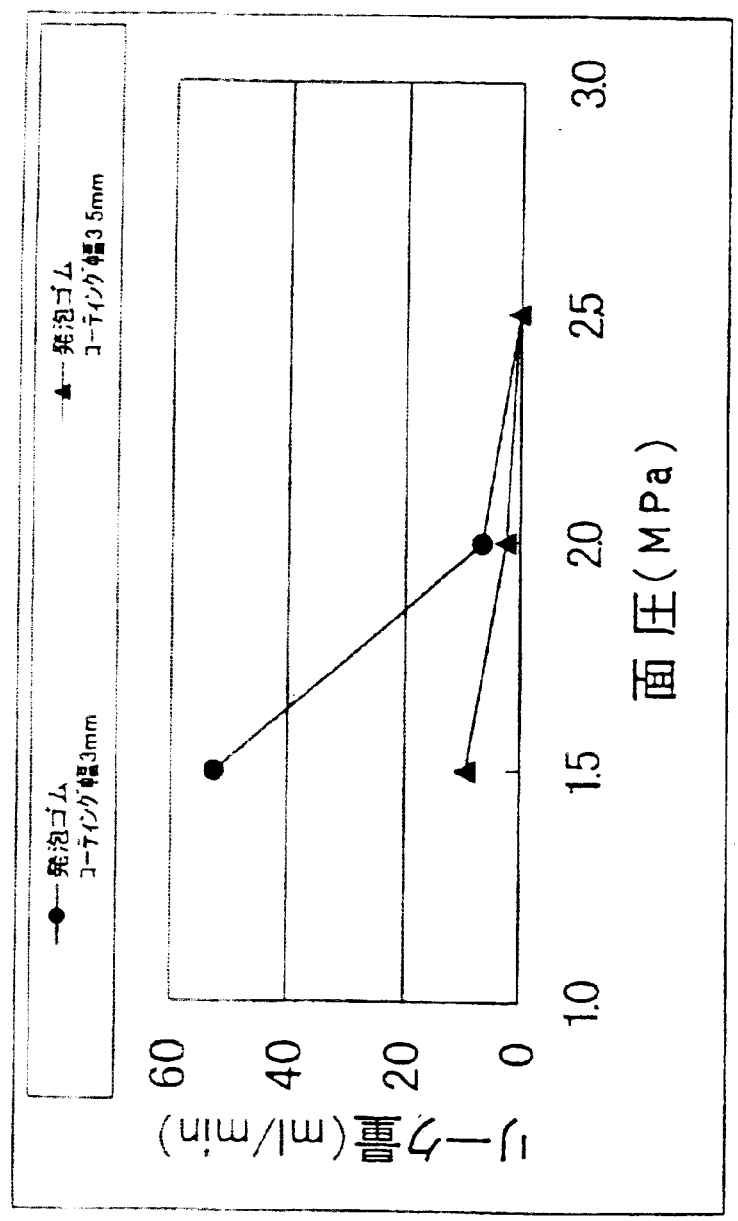
FIG. 7 is a graph showing the result of a comparative test.
Figure 8:
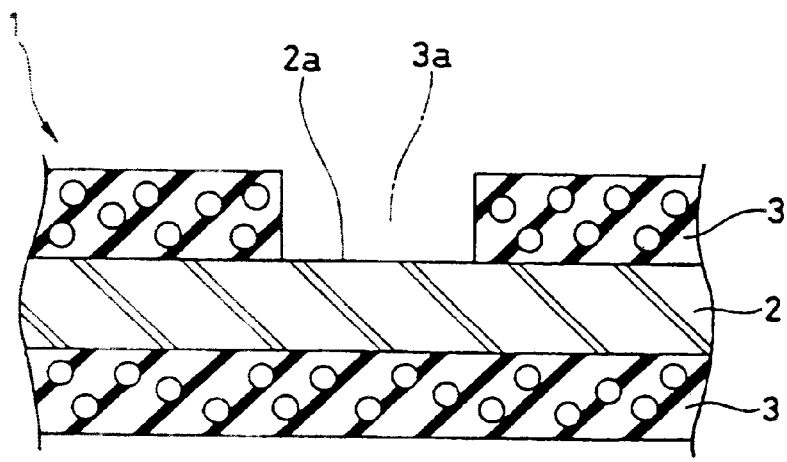
FIG. 8 is an essential part sectional view of a conventional separation plate.

FIG. 7 shows the result of the comparison of difference in leak between the widths 3 mm and 3.5 mm of the foamed rubber layer 3, and it could be confirmed that the leak (particularly, leak at low pressure) is lesser as the width is larger.

Test Condition
    Test Temperature: Room temperature
    Test Piece: Foamed rubber coat products (with different coat widths 3, 3.5 mm)
    Counter seal surface width (land width): 3 mm
    Surface Pressure: 1.5, 2.0, 2.5 MPa
    Sealed fluid: ATF oil 1.0 MPa (constant)
    This invention has the following effects.

In the separation plate and the method for producing the same according to claim 1 or 4 of this invention, since the foamed rubber is applied only to the part necessary for sealing of the separation plate body by the dispenser coating or screen coating, and the part to be coated with the foamed rubber is limited to only the part necessary for sealing, the seal unnecessary part including the part forming the receiving seat to the spring or ball is not coated with the foamed rubber from the first of the production. Accordingly, a surface exposed part with perfectly and uniformly exposed state can be formed on the separation plate body. Since the rubber removing work for the seal unnecessary part is dispensed with from the same reason, the production of the separation plate can be facilitated to reduce the working time and working cost.

In the separation plate or the method for producing the same according to claim 2 or 5 of this invention, since the foamed rubber is applied to the separation plate body according to the form of the land part provided on the valve body, and the part to be coated with the foamed rubber is limited to only the part according to the form of the land part or the part necessary for sealing, the seal unnecessary part including the part forming the receiving seat to the spring or ball is not coated with the foamed rubber from the first of the production. Accordingly, a surface exposed part with perfectly and uniformly exposed state can be formed on the separation plate body. Since the rubber removing work for the seal unnecessary part is dispensed with from the same reason, the manufacture of the separation plate can be facilitated to reduce the working time and working cost.

According to the separation plate of this invention, further, the foamed rubber layer is applied after press working, or the foamed rubber layer is applied so as not to extend to the press end surface, whereby generation of rubber burrs at the time of press working can be prevented. Accordingly, the operation of the valve can be prevented from being hindered by the outflow of rubber burrs as foreign matter into the valve body.

The foamed rubber layer is not arranged around the insert holes for fastening bolt provided on the separation plate, whereby the foamed rubber layer can be prevented from being fatigued by fastening. Accordingly, the looseness of a fastening bolt by the fatigue of the foamed rubber layer can be prevented, and the reduction in sealing property resulted from the looseness of the fastening bolt can be prevented.

The adaptation of the dispenser coating method or screen coating method facilitates the coating work, and a with necessary minimum width and height can be performed. The using quantity of rubber can be also minimized. Accordingly, the easier production and the lower cost for product can be realized by such easy coating method and reduction in using quantity of rubber.

Further, the separation plate having the foamed rubber by screen printing exhibits its performance particularly when the difference between a high-surface pressure part and a low-surface pressure part is large in mounting, or under a high-temperature, high-hydraulic pressure environment.

When the edge part of the foamed rubber layer is formed into a sloped root, particularly, a gently sloped root, generation of rubber burrs can be more surely avoided, and satisfactory sealing characteristic can be provided. Particularly, a gently sloped root as in FIGS. 5–6 is more preferable than a relatively sharply sloped root as in FIGS. 2–3.

What is claimed is:

1. A separation plate to be mounted on a valve body in an automatic transmission, said separation plate comprising:
    a separation plate body, and
    a foamed rubber layer applied to at least one side of the separation plate body, the foamed rubber layer being applied only to a part of the separation plate body necessary for sealing so that the separation plate body is exposed toward the valve body except for the applied part, the foamed rubber layer having a width at a bottom portion thereof larger than a width at any other portions including a top thereof when the separation plate is mounted in place on the valve body.

2. The separation plate according to claim 1, wherein the valve body has a plurality of land parts, the foamed rubber layer having a shape or pattern corresponding to a shape or pattern of the land parts.

3. The separation plate according to claim 2, wherein the foamed rubber layer has a sloped root at each of both edges of the foamed rubber layer.

4. The separation plate according to claim 3, wherein the foamed rubber layer extends in its width direction between the separation plate body and the land parts so that the width of the foamed rubber layer is larger than that of the land parts.

5. The separation plate according to claim 2, wherein the foamed rubber layer extends in its width direction between the separation plate body and the land parts so that the width of the foamed rubber layer is larger than that of the land parts.

6. The separation plate according to claim 1, wherein the foamed rubber layer has a sloped root at each of both edges of the foamed rubber layer.

7. The separation plate according to claim 6, wherein the foamed rubber layer extends in its width direction between the separation plate body and the land parts so that the width of the foamed rubber layer is larger than that of the land parts.

* * * * *